(12) United States Patent
Lewis

(10) Patent No.: US 8,407,211 B1
(45) Date of Patent: Mar. 26, 2013

(54) DETERMINING RELEVANCE SCORES FOR LOCATIONS

(75) Inventor: Matt Lewis, Oxford (GB)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 12/969,933

(22) Filed: Dec. 16, 2010

(51) Int. Cl.
G06F 7/00 (2006.01)
G06F 17/30 (2006.01)

(52) U.S. Cl. ........................................ 707/722; 707/706

(58) Field of Classification Search ................. None
See application file for complete search history.

(56) References Cited

U.S. PATENT DOCUMENTS

| | | | |
|---|---|---|---|
| 6,542,116 | B1 | 4/2003 | Sahai et al. |
| 7,917,464 | B2 * | 3/2011 | Frank et al. ................. 707/602 |
| 8,001,121 | B2 | 8/2011 | Wang et al. |
| 8,019,763 | B2 | 9/2011 | Wang et al. |
| 2005/0015307 | A1 * | 1/2005 | Simpson et al. .............. 705/26 |
| 2005/0065811 | A1 * | 3/2005 | Chu et al. .................... 705/1 |
| 2006/0080300 | A1 | 4/2006 | Gruenwald |
| 2007/0027837 | A1 | 2/2007 | Kutsch et al. |
| 2008/0028010 | A1 | 1/2008 | Ramsey |

\* cited by examiner

*Primary Examiner* — Pierre Vital
*Assistant Examiner* — Taelor Kim
(74) *Attorney, Agent, or Firm* — Fish & Richardson P.C.

(57) ABSTRACT

Methods, systems, and apparatus, including computer programs encoded on a computer storage medium, for determining relevance scores for locations. In one aspect, a method includes storing a respective plurality of category-location relevance scores for each location of a plurality of geographic locations. A category-location relevance score is based on a plurality of category-entity-location relevance scores for a plurality of entities associated with the category at the location. A first category-location relevance score is determined for a first geographic location that is not one of the plurality of geographic locations. Determining the first category-location relevance score includes calculating the first category-location relevance score based on a second category-location relevance score for a second geographic location in the plurality of geographic locations and a physical distance between the first geographic location and the second geographic location.

15 Claims, 5 Drawing Sheets

DETERMINING RELEVANCE SCORES FOR LOCATIONS

BACKGROUND

This specification relates to providing information tailored to geographic locations.

Location based services have become increasingly popular with the rise of mobile electronic devices. Mobile devices can provide a reasonably precise location of a user, even when the user is away from a home or office. This reasonably precise location information allows location based services to provide information tailored to a user based on his location. For example, search results from a search service can be tailored to a specific location, e.g., a location of a user, or a location in which a user has expressed interest.

Certain kinds of information are more likely to be interesting to or appropriate for a user physically in or interested in a certain location. For example, information related to restaurants or public transportation is likely to be appropriate for a user in San Francisco, but is less likely to be appropriate for the same user when the user is at Yosemite National Park, because while San Francisco has a large number of restaurants and many public transportation options, Yosemite National Park has relatively few restaurants or public transportation options.

SUMMARY

A location relevance system determines a relevance score indicating the relevance of a category to a user interested in a particular location. The relevance of the category is based on the relevance of various entities associated with the category. The category is, for example, a business category (e.g., restaurants), and the entities are businesses associated with that business category (e.g., particular restaurants).

The location relevance system pre-computes relevance scores for a category for various prominent locations. Then, the location relevance system approximates a relevance score for the category for another location. The system approximates the score using the pre-computed relevance score of one of the prominent locations and a physical distance between the prominent location and the other location. In some implementations, the location relevance system stores Taylor coefficients for a location relevance function. An information provider uses a relevance score to select and provide relevant information to a user who is interested in a particular location.

In general, one aspect of the subject matter described in this specification can be embodied in methods that include the actions of storing a respective plurality of category-location relevance scores for each location of a plurality of geographic locations. Each category-location relevance score for each location estimates a relevance of a respective category to the location. A category-location relevance score is based on a plurality of category-entity-location relevance scores for a plurality of entities associated with the category at the location. The actions further include determining a first category-location relevance score for a first geographic location that is not one of the plurality of geographic locations. Determining the first category-location relevance score includes selecting a second geographic location in the plurality of geographic locations. Determining the first category-location relevance score includes calculating the first category-location relevance score based on a second category-location relevance score for the second geographic location and a physical distance between the first geographic location and the second geographic location. Other embodiments of this aspect include corresponding systems, apparatus, and computer program products.

These and other embodiments can optionally include one or more of the following features. The actions further include selecting an item from a plurality of candidate items using the first category-location relevance score. Selecting the item comprises receiving a query stub from a user associated with the first geographic location; identifying a plurality of possible query suggestions for the query stub; ranking the possible query suggestions using the first category-location relevance score; and providing to the user at least a highest ranked possible query suggestion. Selecting the item comprises selecting an ad from a plurality of ads for a user associated with the first geographic location. The category is a business category and the plurality of entities is a plurality of businesses in the business category, and wherein each category-entity-location relevance score for a business is based on a physical distance between an address of the business in the category and a geographic location. The first geographic location is associated with a user, and the second geographic location is a prominent geographic location.

Storing a category-location relevance score for a location comprises storing a plurality of Taylor coefficients for a function at the location, wherein an evaluation of the function for a location provides a category-location relevance score for the category, and wherein an evaluation of the function at a location is determined by evaluating a sub-function for each of the plurality of entities, and wherein an evaluation of the sub-function for an entity provides a category-entity-location relevance score for the entity and the location. Each Taylor coefficient for the function at the location is derived from an evaluation of the function or an evaluation of the derivative of the function at the location. Storing the plurality of Taylor coefficients comprises using automatic differentiation of the function at the location. Approximating the first relevance score includes evaluating a Taylor series for the function using the Taylor coefficients for the function at the second geographic location and the physical distance between the first geographic location and the second geographic location.

Particular embodiments of the invention can be implemented to realize one or more of the following advantages. A relevance score that estimates how relevant a business category is to a location of a user based on nearby businesses in the business category and the user's location can be determined more quickly, and with fewer resources, than it could generally be determined using conventional techniques. This is particularly advantageous when the relevance score evaluation is particularly time consuming or resource intensive. Less computer storage resources can be used, because evaluations of the function only need to be stored for a sufficient number of locations to reach a desired level of precision. The relevance score for a location can be approximated by using a pre-computed relevance score for a single other location.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
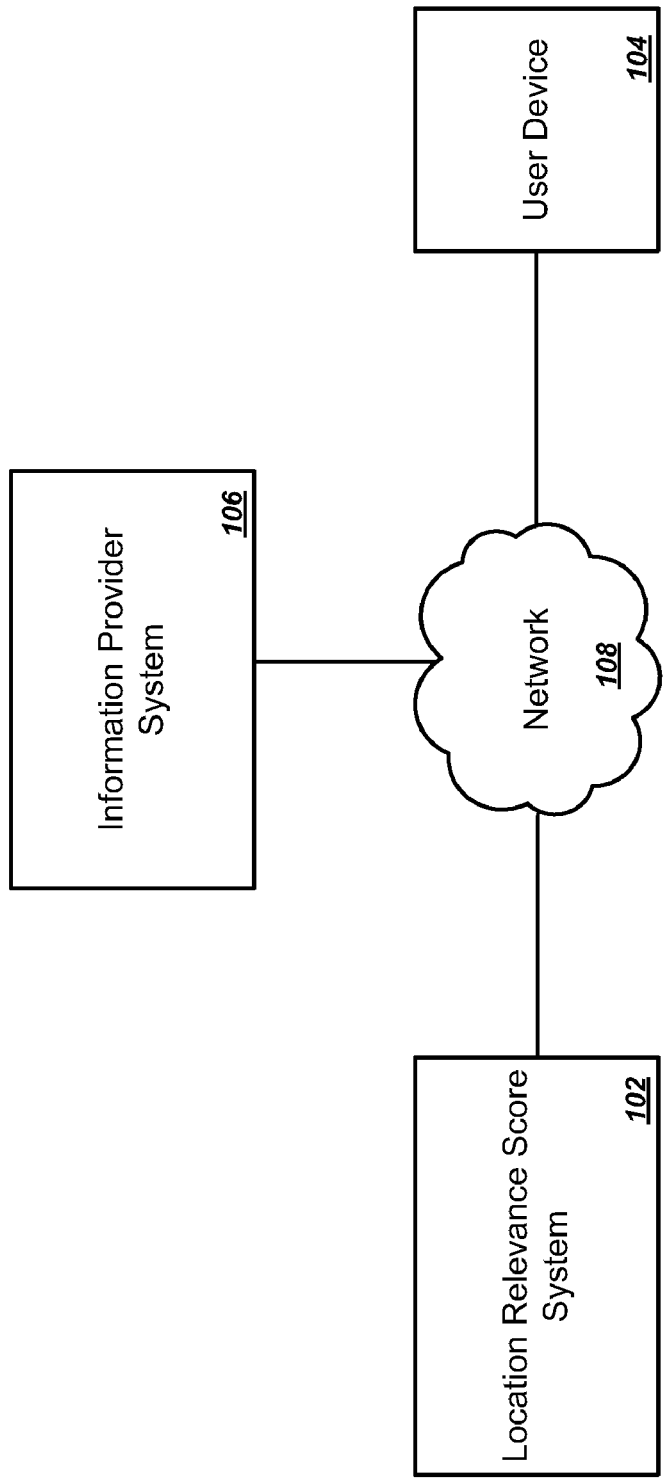
FIG. 1 is block diagram illustrating computer systems that interact with a location relevance system.

FIG. 1 is block diagram illustrating a location relevance system 102, and systems that interact with the location relevance system 102, i.e., a user device 104 and an information provider system 106. Each system is one or more computers. While the three systems are illustrated in FIG. 1 as being separate systems, in some implementations, they are combined with each other. For example, in some implementations, the information provider system 106 and the location relevance system 102 are part of the same system.

The user device 104, the location relevance system 102, and the information system 106 interact to provide users with needed information relevant to the user's location. For example, consider an example where a user is entering a search query into the user device 106 while physically located at a particular location. When the user pauses while entering the query, the user device 106 submits the query stub (the incomplete query) to an information provider system 104 that is a search system. The information provider system 104 determines candidate query suggestions based on the query stub. To provide more appropriate query suggestions, the information provider system 104 determines the relevance of various business categories to the user's location from scores received from the location relevance system 102 and selects candidate query suggestions from the most relevant categories. The user device 104, information provider system 106, and location relevance system 102 are described in more detail below.

The user device 104 can be, for example, a personal computer or a mobile device. A user uses the user device 104 to send and receive information from the information provider. The user device 104 sends data to the information provider 106 that describes a location of interest to the user. In some implementations, the location is the current location of the user device. In these implementations, the user device 104 can determine the current location using hardware or software for approximating a current location of the device, e.g., using Global Positioning System (GPS) signals, cell phone tower signals, or visible wireless access points. In other implementations, the location is a location specified by a user as being of interest to the user. For example, if a user is currently in San Francisco, Calif., but is planning a trip to New York, N.Y., the user can provide the location New York, New York to the user device 104, and the user device 104 can provide the location New York, N.Y. to the information provider 106.

The information provider 106 receives location information from the user device 104 and provides information to the user device 104, e.g., over the network 108. The information provider 106 can provide various types of information. In general, the information provided by the information provider 106 is tailored to the location information received from the user device 104. The information provider 106 selects information from categories that are determined to be relevant to the user by requesting relevance scores for various categories from the location relevance system 102, and then selecting relevant categories based on the scores. In some implementations, the category is a business category. Examples of business categories are restaurants, movie theaters, public transportation options, retail stores, business name, and business size.

For example, in some implementations, the information provider 106 is a search system that generates and provides search results to users. When a user submits a search request to the information provider 106 using the user device 104, the search system identifies resources that the search engine determines to be relevant to the search request. The search system generates search results that identify the relevant resources, and returns the search results to the user device 104. A search system can use user location data in various ways. For example, in some implementations, as a user begins to enter a search query on the user device 104, a search system provides suggested queries based on the partial input received and a relevance of candidate query suggestions to the location information for the user. As another example, in some implementations, a search system can re-rank search results according to a relevance of the search results and the location.

As another example, in some implementations, the information provider 106 is an advertising system that selects advertisements for presentation with content, for example, with search results or on a web page. In general, the advertising system selects advertisements by ranking candidate advertisements on various factors, for example, whether the advertisement matches keywords extracted from the content being displayed or a user's search query or whether the advertisement matches a profile of the user. The advertising system provides a number of the highest ranked candidate advertisements to the user device 104. An advertising system can use user location data in various ways. In some implementations, the advertising system ranks candidate advertisements using relevance scores from the location relevance system 102. Other types of information providers can provide additional information to the user device 104.

The location relevance system 102 determines relevance scores that indicate the relevance of a category to a particular geographic location. These location relevance scores are used by the information provider system 106 in providing requested information to a user, for example, as described above.

The location relevance system 102 determines a relevance score using a relevance function. The relevance score indicates the relevance of a category to a particular geographic location. The relevance scores are typically scalar values on a scale. A relevance score on one end of the scale indicates that a user interested in the particular location is more likely to find information on entities in the category useful or interesting, and a relevance score on the other end of the scale indicates that the user is less likely to find the information useful or interesting. The relevance function is based on a relevance sub-function that determines the relevance of an entity associated with the category to a location. The relevance function aggregates relevance scores provided by the relevance sub-function for entities in the category.

Determining relevance scores can be computationally intensive. For example, if a category has many entities associated with it, determining a relevance score for the category can involve determining a relevance score for each of the many entities. Therefore, the location relevance system 102 pre-computes relevance scores for some locations and uses the pre-computed relevance scores to approximate relevance scores for other locations. Pre-computing scores for some locations and approximating relevance scores for other locations can improve the speed at which relevance scores are determined, because it can be faster to approximate from the stored values than to determine a relevance score using the relevance function.

For example, in some implementations, the location relevance system 102 stores Taylor coefficients for a relevance function at various prominent locations. The location relevance system 102 uses the Taylor coefficients to approximate an evaluation of the function at another location that is not one of the prominent locations by evaluating a Taylor series for the function. Example processes for storing Taylor coefficients and for approximating an evaluation of the function are described in more detail below with reference to FIGS. 3 and 4.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of a user cannot be determined.

Figure 2:
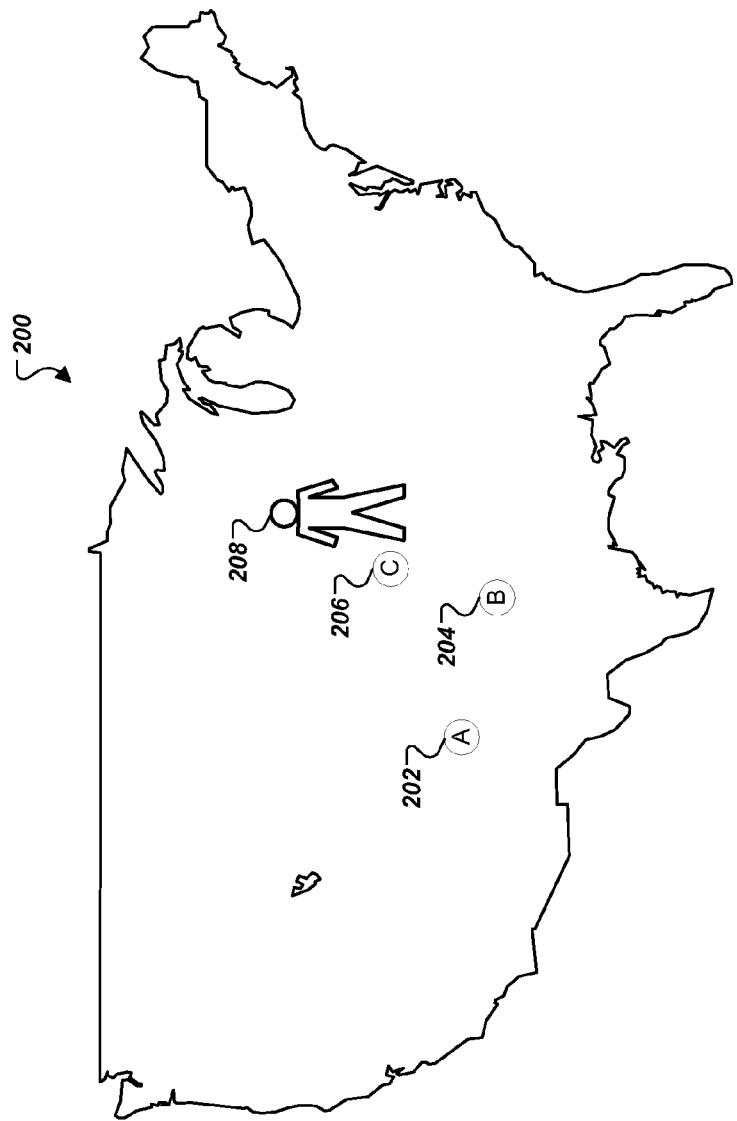
FIG. 2 is a diagram illustrating three example geographic locations on an example map.

FIG. 2 is a diagram illustrating three example geographic locations: location A 202, location A 204, and location C 206 on an example map 200. When a user 208 is at location C 208, a location relevance system, for example, the location relevance system 102 described above with reference to FIG. 1, can approximate a relevance score for various categories to location C, using stored data for one of location A 202 or B 204.

The location relevance system computes and stores evaluations of the relevance function for various locations. The location relevance system also computes and stores evaluations of derivatives of the relevance function. In the example illustrated in FIG. 2, the location relevance system stores evaluations of the relevance function and derivatives of the relevance function for locations A and B 202 and 204, but not for location C 206.

The location relevance system then uses the stored evaluations of the function and its derivatives to estimate relevance scores for location C 208. For example, in some implementations, the location relevance system evaluates a Taylor series using the values stored for location B 204 to approximate the relevance score for location C 208. This process is described in more detail below with reference to FIG. 4. The location relevance system uses location B 204 instead of location A 202 because location B 204 is physically closer to location C 206 than location A 202 is.

Once generated, the relevance scores can be used in various ways, as described in more detail above with reference to FIG. 1.

Figure 3:
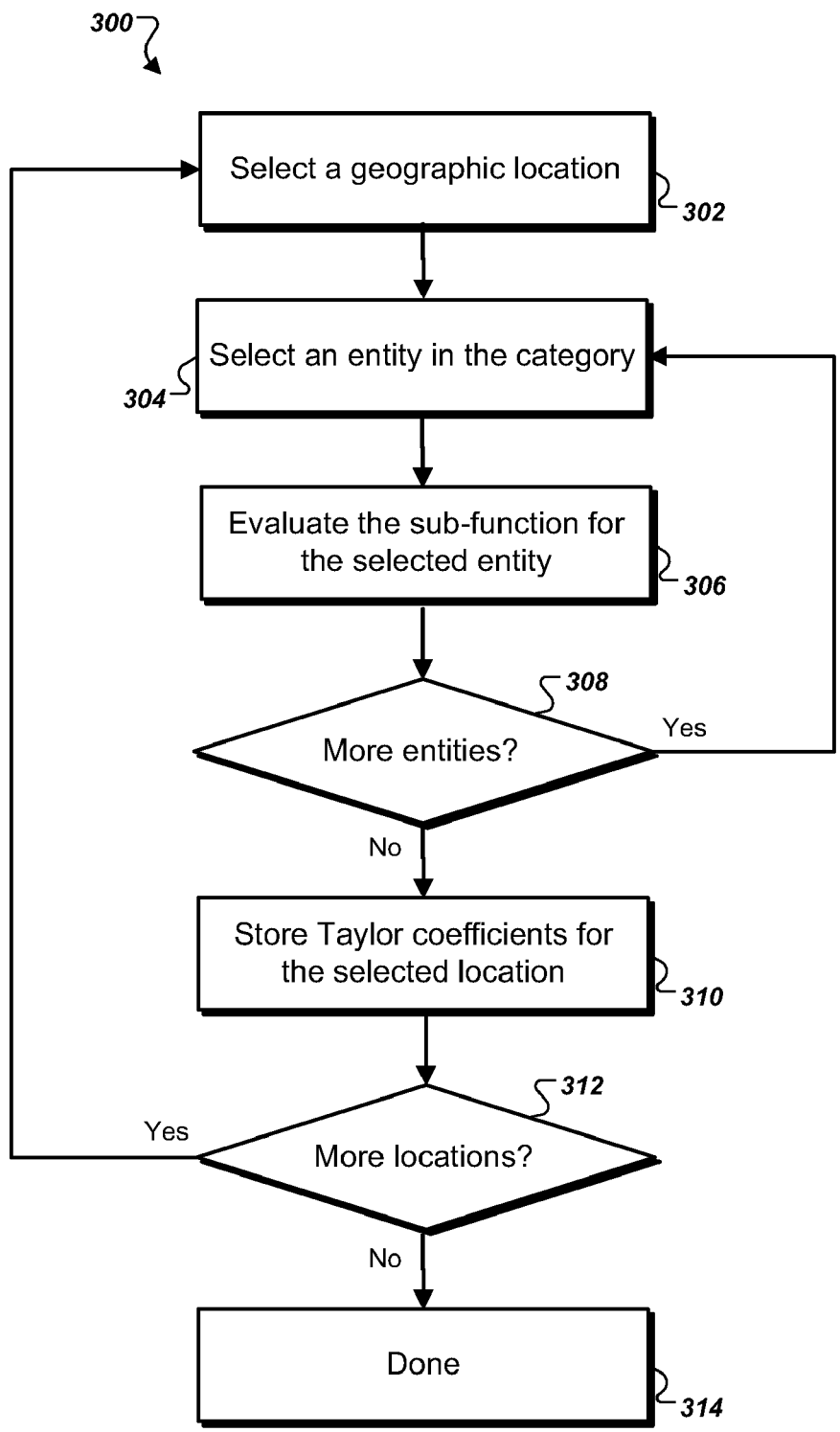
FIG. 3 is a flow diagram of an example process for generating and storing Taylor coefficients for a relevance function.

FIG. 3 is a flow diagram of an example process 300 for generating and storing Taylor coefficients for a relevance function. For convenience, the process 300 will be described with respect to a system including one or more computing devices that performs the process 300. In some implementations, the system is a location relevance system, e.g., the location relevance system 102 described above with reference to FIG. 1.

An evaluation of the relevance function for a location provides a relevance score that indicates the relevance of a category to the location. The relevance score provided by the function can be referred to as a category-location relevance score. The function can be expressed as:

$$f(x) = \sum_{y \in Y} g(x, y),$$

where Y is the set of entities associated with the category, y is a entity associated with the category, and g(x, y) is a sub-function that, when evaluated, provides a relevance score that indicates the relevance an entity y to a location x. The relevance score provided by the sub-function can be referred to as a category-entity-location relevance score. A system that performs the process 300 stores Taylor coefficients for $f(x)$ for a variety of locations.

The system selects a geographic location (step 302). The geographic location is, for example, a zip code, a city, a state, or the like. In some implementations, the geographic location is selected from a plurality of prominent geographic locations, e.g., landmarks, locations with a high density of users, and locations that are frequently the subjects of search requests. The prominent geographic locations are provided, for example, by a human operator, or by a computer system that selects, for instance, a number of the most populous cities or zip codes in an area. From the prominent geographic locations, the system selects locations, e.g., alphabetically or in order of population or in order of popularity, until Taylor coefficients are stored for all the locations. Alternatively, the system randomly samples locations in a given area, or selects locations at evenly spaced intervals across an area so that any location within the area is no more than a threshold distance from a location having stored Taylor coefficients.

To evaluate the relevance function for the selected location, the system evaluates the sub-function (referred to as g(x, y) above) for a plurality of entities and sums the resulting relevance scores (steps 304-308). In some implementations, the sub-function provides the physical distance between a location x and a location associated with the entity y. For example, the sub-function can determine an address for the entity y and determine the distance between that address and the location x. The distance can be considered a simple indicator of relevance. In some implementations, the sub-function draws on various other signals to provide a relevance score, for example, signals rating the entity in different contexts.

The system selects an entity associated with the category (step 304). For example, if the category is a business category (e.g., restaurants), the system selects a business associated with the category (e.g., a particular restaurant). The system evaluates the sub-function for the selected entity (step 306). In some implementations, the system maintains a running sum of the resulting relevance scores for the entities by initializing a sum at zero and then adding each relevance score to the sum. The system determines if there are more entities (step 308), and if so, evaluates the sub-function for those entities (repeat steps 304 and 306).

The system determines and stores one or more Taylor coefficients for the function at the selected location (step 310). The number of Taylor coefficients stored can be large to increase the accuracy of later approximations or small to decrease the amount of storage and computational resources used in determining the coefficients. The Taylor coefficients for the function $f(x)$ at a location a are given by:

$$\frac{f^{(n)}(a)}{n!},$$

where $f^{(n)}(a)$ is the nth order derivative of $f(x)$ at a.

In some implementations, the system uses conventional automatic differentiation techniques to evaluate derivatives of the function. In other implementations, the system uses numerical differentiation techniques. In some implementations, the function is differentiated symbolically (e.g., by a person or by a computer using symbolic differentiation techniques).

The system determines whether there are more locations (step 312), and if so, repeats the process (return to step 303). If there are no more locations, the process is complete (step 314).

Figure 4:
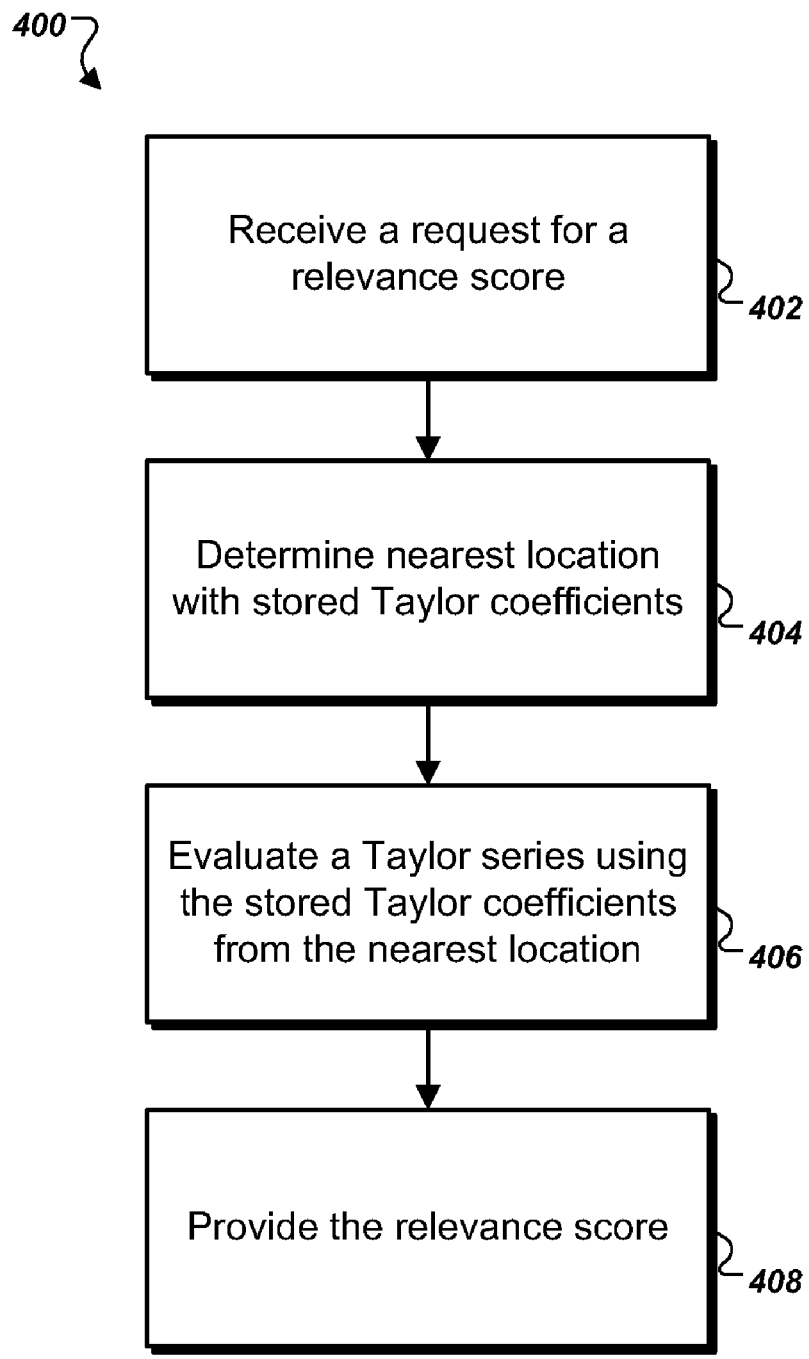
FIG. 4 is a flow diagram of an example process for providing relevance scores that indicate the relevance of a category to a location.

FIG. 4 is a flow diagram of an example process 400 for providing relevance scores that indicate the relevance of a category to a location. For convenience, the process 400 will be described with respect to a system including one or more computing devices that perform the process 400. In some implementations, the system is a location relevance system, e.g., the location relevance system 102 described above with reference to FIG. 1.

The system receives a request for a relevance score indicating the relevance of a category to a requested location (step 402). In some implementations, the request is from an information provider, for example, the information provider 106 described above with reference to FIG. 1. The system does not have a relevance score for the requested location in storage. In implementations where the system receives location information or personal information with the request, the system may anonymize or generalize the information as discussed above with reference to FIG. 1. The system may provide an opportunity to opt in/out of the collection of location information or personal information.

The system determines the nearest location, e.g., in terms of physical distance, to the requested location having stored Taylor coefficients for a function that, when evaluated, provides a relevance score for the category and a location (step 404). For example, in FIG. 2, the location nearest to location "c" 206 having stored Taylor coefficients is location "b" 204. The Taylor coefficients were previously generated and stored, for example, using the process 300 illustrated in FIG. 3.

Various conventional techniques can be used to determine the nearest location. For example, the system can calculate a physical distance between the requested location and several locations for which Taylor coefficients are stored and select the location having the shortest physical distance. In some implementations, the physical distance is the Euclidean distance. In some implementations, the physical distance is the driving distance for a car, e.g., received from a system that provides driving directions.

The system evaluates a Taylor series using the stored Taylor coefficients from the nearest location and a physical distance between the requested location and the nearest location (step 406). The evaluation of the Taylor series provides an approximation of the relevance score that the function would provide if evaluated at the requested location. The Taylor series for a function $f(x)$ for a value a is given by:

$$\sum_{n=0}^{\infty} \frac{f^{(n)}(a)}{n!}(x-a)^n,$$

where $f^{(n)}(a)$ is the nth order derivative of $f(x)$ at a. Although the Taylor series is given as an infinite sum, using a finite number of terms of the series provides an approximation of the function for the value a. Using a larger number of terms increases the accuracy of the approximation.

The system provides the approximation of the relevance score (step 408). Typically, the system sends the relevance score to whatever entity requested the score (e.g., the information provider 106 of FIG. 1).

Figure 5:
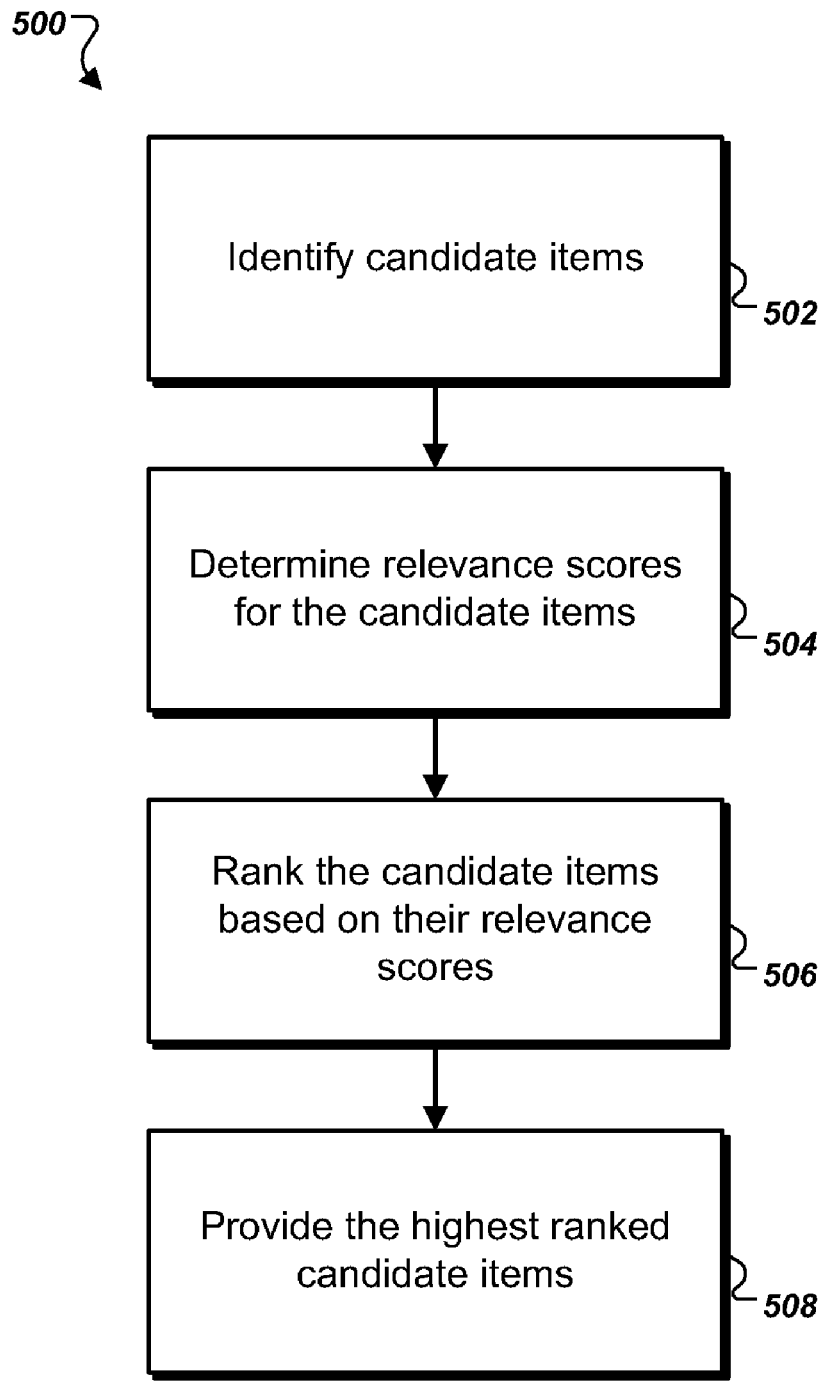
FIG. 5 is a flow diagram of an example process for ranking candidate items.

FIG. 5 is a flow diagram of an example process 500 for ranking candidate items. For convenience, the process 500 will be described with respect to a system including one or more computing devices that perform the process 500. In some implementations, the process is performed by a location relevance system (e.g., the location relevance system 102 of FIG. 1), or an information provider (e.g., the information provider 106 of FIG. 1).

The system identifies candidate items (step 502). The candidate items are, for example, candidate search results responsive to a search query, candidate advertisements for a particular user, and candidate query suggestions for a query stub. The candidate items are each associated with a category.

For example, in implementations where the system is an advertising system, the system identifies candidate ads based on, e.g., a keyword by comparing the keyword with each candidate item's associated category. As another example, in implementations where the system is a search system, the system identifies candidate query suggestions based on a query stub. For example, the system identifies candidate query suggestions having the same first few letters as the query stub. In an additional example, a search system identifies candidate search results for a query.

In implementations where the system receives location information or personal information to identify candidate items, the system may anonymize or generalize the information as discussed above with reference to FIG. 1. The system may provide users an opportunity to opt in/out of the collection or use of location information or personal information. For example, in implementations where the system is an advertising system, the system may provide users an opportunity to opt out of the use of personal information for identifying candidate ads.

The system determines relevance scores for the categories associated with the candidate items (step 504), for example, using the process 400 described above with reference to FIG. 4. In some implementations, the system requests relevance scores for the categories associated with each candidate item from a location relevance system instead of determining the relevance scores itself. For example, a search system requests a relevance score for a category associated with a query suggestion from a location relevance system. In another example, a search system requests a relevance score for a category associated with a search result responsive to a query from a location relevance system. In a further example, an advertising system requests a relevance score for a category associated with an ad from a location relevance system.

The system ranks the candidate items based on their relevance scores (step 506). In general, the system ranks the candidate items with the highest relevance scores the highest. Alternatively, the system includes other factors in ranking the candidate items. For example, where the candidate items are search results, the system combines each relevance score with another score based on the relevance of the search result to a query. In another example, where the candidate items are query suggestions, the system combines each relevance score with another score based on the popularity of the query suggestion. In a further example, where the candidate items are advertisements, the system combines each relevance score with another score based on whether the advertisement matches a keyword.

The system provides the highest ranked candidate items (step 508). For example, the system provides the single highest ranked candidate item, or a requested number of the highest ranked candidate items.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. One or more computers comprising:
a processor;
a memory;
wherein the one or more computers are configured to perform operations comprising:
storing a respective plurality of category-location relevance scores for each location of a plurality of geographic locations, wherein each category-location relevance score for each location estimates a relevance of a respective category to the location, and wherein a category-location relevance score is based on a plurality of category-entity-location relevance scores for a plurality of entities associated with the category at the location, wherein
storing a category-location relevance score for a location comprises storing a plurality of Taylor coefficients for a function at the location, wherein an evaluation of the function for a location provides a category-location relevance score for the category, and wherein an evaluation of the function at a location is determined by evaluating a sub-function for each of the plurality of entities, and wherein an evaluation of the sub-function for an entity provides a category-entity-location relevance score for the entity and the location;
determining a first category-location relevance score for a first geographic location that is not one of the plurality of geographic locations, including:
selecting a second geographic location in the plurality of geographic locations, and
calculating the first category-location relevance score based on a second category-location relevance score for the second geographic location and a physical distance between the first geographic location and the second geographic location; and
selecting an item from a plurality of candidate items using the first category location relevance score, wherein each candidate item is associated with a respective category, and wherein selecting the item comprises:
ranking the plurality of candidate items using the first category location relevance score, and
selecting a highest ranked candidate item.

2. The system of claim 1, wherein selecting the item comprises selecting an ad from a plurality of ads for a user associated with the first geographic location.

3. The system of claim 1, wherein the category is a business category and the plurality of entities is a plurality of businesses in the business category, and wherein each category-entity-location relevance score for a business is based on a physical distance between an address of the business in the category and a geographic location.

4. The system of claim 1, wherein the first geographic location is associated with a user, and wherein the second geographic location is a prominent geographic location.

5. The system of claim 1, wherein each Taylor coefficient for the function at the location is derived from an evaluation of the function or an evaluation of the derivative of the function at the location.

6. The system of claim 1, wherein storing the plurality of Taylor coefficients comprises using automatic differentiation of the function at the location.

7. The system of claim 1, wherein approximating the first relevance score includes evaluating a Taylor series for the function using the Taylor coefficients for the function at the second geographic location and the physical distance between the first geographic location and the second geographic location.

8. A method performed by data processing apparatus, the method comprising: one or more computers configured to perform operations comprising:
storing a respective plurality of category-location relevance scores for each location of a plurality of geographic locations, wherein each category-location relevance score for each location estimates a relevance of a respective category to the location, and wherein a category-location relevance score is based on a plurality of category-entity-location relevance scores for a plurality of entities associated with the category at the location, wherein storing a category-location relevance score for a location comprises storing a plurality of Taylor coefficients for a function at the location, wherein an evaluation of the function for a location provides a category-location relevance score for the category, and wherein an evaluation of the function at a location is determined by evaluating a sub-function for each of the plurality of entities, and wherein an evaluation of the sub-function for an entity provides a category-entity-location relevance score for the entity and the location;

determining a first category-location relevance score for a first geographic location that is not one of the plurality of geographic locations, including:
- selecting a second geographic location in the plurality of geographic locations, and
- calculating the first category-location relevance score based on a second category-location relevance score for the second geographic location and a physical distance between the first geographic location and the second geographic location; and selecting an item from a plurality of candidate items using the first category location relevance score, wherein each candidate item is associated with a respective category, and wherein selecting the item comprises:
- ranking the plurality of candidate items using the first category location relevance score, and
- selecting a highest ranked candidate item.

9. The method of claim 8, wherein selecting the item comprises selecting an ad from a plurality of ads for a user associated with the first geographic location.

10. The method of claim 8, wherein the category is a business category and the plurality of entities is a plurality of businesses in the business category, and wherein each category-entity-location relevance score for a business is based on a physical distance between an address of the business in the category and a geographic location.

11. The method of claim 8, wherein the first geographic location is associated with a user, and wherein the second geographic location is a prominent geographic location.

12. The method of claim 8, wherein each Taylor coefficient for the function at the location is derived from an evaluation of the function or an evaluation of the derivative of the function at the location.

13. The method of claim 8, wherein storing the plurality of Taylor coefficients comprises using automatic differentiation of the function at the location.

14. The method of claim 8, wherein approximating the first relevance score includes evaluating a Taylor series for the function using the Taylor coefficients for the function at the second geographic location and the physical distance between the first geographic location and the second geographic location.

15. A non-transitory computer storage medium encoded with a computer program, the program comprising instructions that when executed by data processing apparatus cause the data processing apparatus to perform operations comprising:

storing a respective plurality of category-location relevance scores for each location of a plurality of geographic locations, wherein each category-location relevance score for each location estimates a relevance of a respective category to the location, and wherein a category-location relevance score is based on a plurality of category-entity-location relevance scores for a plurality of entities associated with the category at the location, wherein storing a category-location relevance score for a location comprises storing a plurality of Taylor coefficients for a function at the location, wherein an evaluation of the function for a location provides a category-location relevance score for the category, and wherein an evaluation of the function at a location is determined by evaluating a sub-function for each of the plurality of entities, and wherein an evaluation of the sub-function for an entity provides a category-entity-location relevance score for the entity and the location;

determining a first category-location relevance score for a first geographic location that is not one of the plurality of geographic locations, including:
- selecting a second geographic location in the plurality of geographic locations; and
- calculating the first category-location relevance score based on a second category-location relevance score for the second geographic location and a physical distance between the first geographic location and the second geographic location; and selecting an item from a plurality of candidate items using the first category location relevance score, wherein each candidate item is associated with a respective category, and wherein selecting the item comprises:
- ranking the plurality of candidate items using the first category location relevance score, and
- selecting a highest ranked candidate item.

* * * * *

UNITED STATES PATENT AND TRADEMARK OFFICE
CERTIFICATE OF CORRECTION

| | |
|---|---|
| PATENT NO. | : 8,407,211 B1 |
| APPLICATION NO. | : 12/969933 |
| DATED | : March 26, 2013 |
| INVENTOR(S) | : Matt Lewis |

It is certified that error appears in the above-identified patent and that said Letters Patent is hereby corrected as shown below:

In the Claims

Column 14, line 37, in Claim 15, delete "locations;" and insert -- locations, --, therefor.

Signed and Sealed this
Fourth Day of June, 2013

Teresa Stanek Rea
*Acting Director of the United States Patent and Trademark Office*